United States Patent
Ikuta

(10) Patent No.: US 6,679,664 B2
(45) Date of Patent: Jan. 20, 2004

(54) PLATE NUT ASSEMBLY

(75) Inventor: Kazuichi Ikuta, Osaka (JP)

(73) Assignee: Wakai & Co., Ltd., Osaka (JP)

( * ) Notice: Subject to any disclaimer, the term of this patent is extended or adjusted under 35 U.S.C. 154(b) by 0 days.

(21) Appl. No.: 10/124,410

(22) Filed: Apr. 18, 2002

(65) Prior Publication Data

US 2002/0154964 A1 Oct. 24, 2002

(30) Foreign Application Priority Data

Apr. 20, 2001 (JP) ........................................ 2001-122623

(51) Int. Cl.$^7$ ................................................ F16B 21/00
(52) U.S. Cl. ...................................... 411/346; 411/427
(58) Field of Search ........................ 411/340–346, 427, 411/999, 386; 206/338

(56) References Cited

U.S. PATENT DOCUMENTS

| | | | | |
|---|---|---|---|---|
| 221,827 | A | * 11/1879 | Johnston | 217/106 |
| 341,146 | A | * 5/1886 | Howes | 411/366.1 |
| 2,609,723 | A | * 9/1952 | Stubbs | 411/340 |
| 5,044,854 | A | * 9/1991 | Oh | 411/344 |
| 5,108,240 | A | * 4/1992 | Liebig | 411/344 |
| 5,779,412 | A | * 7/1998 | Nagai et al. | 411/85 |
| 6,226,952 | B1 | * 5/2001 | Romeu Guardia | 52/698 |
| 6,386,809 | B2 | * 5/2002 | Ikuta | 411/340 |

FOREIGN PATENT DOCUMENTS

| | | |
|---|---|---|
| DE | 195 14 260 | 10/1996 |
| EP | 0 010 833 | 5/1980 |
| JP | 10-306818 | 11/1998 |

* cited by examiner

Primary Examiner—Flemming Saether
Assistant Examiner—Jori Schiffman
(74) Attorney, Agent, or Firm—Wenderoth, Lind & Ponack, L.L.P.

(57) ABSTRACT

A plate nut assembly is provided in which a protrusion provided on a nut has a centering guide function relative to a circular hole so that the protrusion reliably fits in the circular hole to prevent displacement of the nut assembly, even if an external force is applied in a direction perpendicular to an axis of a bolt threaded to the nut. Around an entrance of a threaded hole on one side of the nut, of such a dimension so as to be received within a circular hole formed beforehand in a wall or the like, at a position where the nut is inserted into the hole, the protrusion is formed so that height of the protrusion decreases in a direction away from the threaded hole. A recess having substantially the same outer shape as that of the protrusion is formed around the threaded hole on another side of the nut. The recess has opposed end walls that are inclined such that a distance between the opposed end walls decreases in a direction toward a bottom of the recess.

9 Claims, 4 Drawing Sheets

PLATE NUT ASSEMBLY

BACKGROUND OF THE INVENTION

This invention relates to a plate nut assembly used to fasten an instrument or the like to a wall or the like, to a back of which hands cannot reach.

When an instrument or the like is bolted to such a member, a plate nut assembly is used. As disclosed in Japanese patent publication 10-306818, the plate nut assembly includes a rectangular plate-like nut having a threaded hole extending in a thickness direction of the nut, and a bendable support tongue piece fixed to the nut. A tool or instrument is fixed to a wall by forming a circular hole in the wall, inserting the nut through the circular hole to a back side of the wall, pulling back the support tongue piece in a direction away from the wall so as to press the nut against the back side of the wall, and threading a bolt through the instrument or tool into the threaded hole of the nut.

When such a plate nut assembly is used, an outer diameter of the bolt to be threaded into the nut is limited to a rather small value as compared to a diameter of the circular hole formed in the wall. Thus, if an external force is applied in a direction perpendicular to an axis of the bolt after mounting of the instrument or tool to the wall, the axis of the bolt tends to be displaced in a direction of the external force until the bolt abuts a peripheral edge of the circular hole, with the bolt and the plate nut assembly in threaded engagement with each other.

In order to prevent such displacement, with a conventional plate nut assembly, a protrusion protruding in a steplike manner is provided around an entrance of the threaded hole of the nut on one side thereof. After inserting the nut into a circular hole in the wall, when the support tongue piece is pulled in a direction away from the wall so as to press the nut against the back side of the wall, the protrusion fits within the circular hole formed in the wall.

However, since the protrusion on the nut of the conventional plate nut assembly is formed of such a shape that protruding surfaces protrude in the form of flat steps, although sought after effects are realized if the protrusion fits snugly in the circular hole of the wall or the like, the protrusion has no guiding function in centering the nut relative to the circular hole to ensure that the threaded hole will be coaxial with respect to the circular hole. Thus, as described above, when the nut is pressed against the back side of the wall by pulling back the support tongue piece in a direction away from the wall, the protrusion abuts the back side of the wall, so that the nut may be displaced relative to the circular hole.

An object of this invention is to provide a plate nut assembly in which a protrusion provided on a nut has a guiding function in centering the nut relative to a circular hole in a wall so that a threaded hole of the nut will be coaxial with respect to the circular hole and the protrusion will reliably fit within the circular hole so as not to be displaced in a direction of an external force, even if the external force is applied in a direction perpendicular to an axis of a bolt in threaded engagement with the threaded hole.

SUMMARY OF THE INVENTION

According to this invention, there is provided a plate nut assembly comprising a rectangular plate-like nut formed with a threaded hole extending in a thickness direction of the nut, and a support tongue piece having one end thereof fixed to the nut at a corresponding end thereof. A protrusion is formed on one side of the nut around the threaded hole, so that a height of the protrusion decreases in a direction away from the threaded hole, and a recess having substantially the same outer shape as that of the protrusion is formed around the threaded hole on another side of the nut. The recess has opposed end walls that are inclined such that a distance between the opposed end walls decreases in a direction toward a bottom of the recess.

According to this invention, by forming a recess on the other side of the nut by performing a pressing operation, material of the nut swells toward the one side, thereby forming the protrusion on the one side of the nut. Thus, it is possible to economically produce the nut.

Also, by inclining the opposed end walls of the recess on the other side of the nut so that the distance between the opposed end walls decreases in a direction toward the bottom of the recess, it is possible to prevent a pressing pressure, for forming the recess, from locally concentrating on the protrusion formed on the one side of the nut, and to prevent an internal structure of the nut from being destroyed along an outer contour of the nut.

Other features and objects of the present invention will become apparent from the following description made with reference to the accompanying drawings, in which:

DETAILED DESCRIPTION OF THE PREFERRED EMBODIMENT

The embodiment of this invention will be described with reference to FIGS. 1A to 4.

Figure 1A:
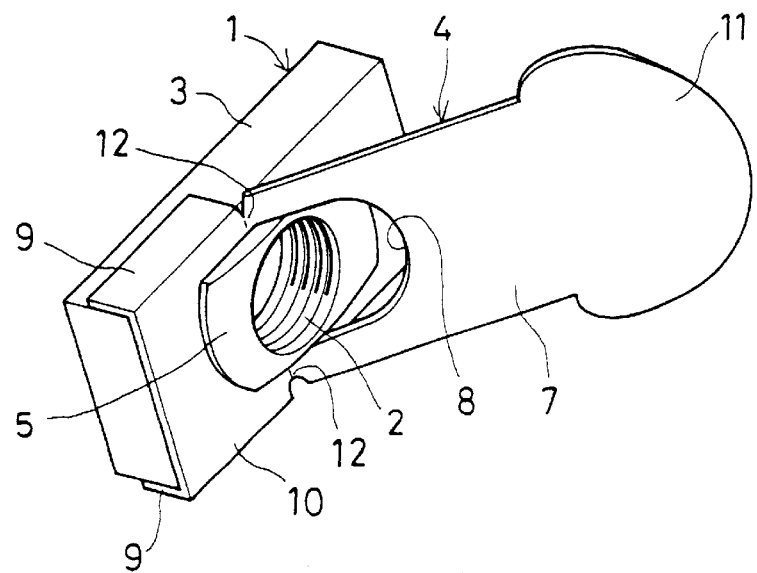
FIG. 1A is a perspective view showing a plate nut assembly embodying this invention.
Figure 1B:
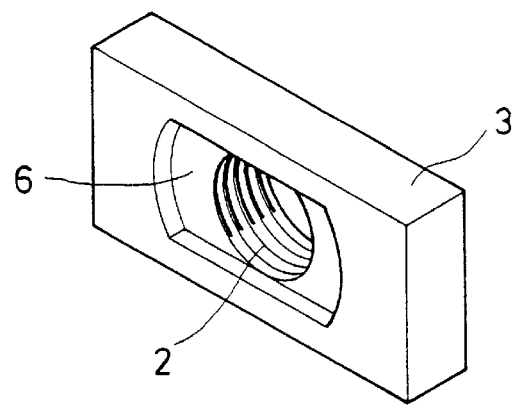
FIG. 1B is a perspective view of the a nut of the plate nut assembly as seen from its back side.
Figure 1C:
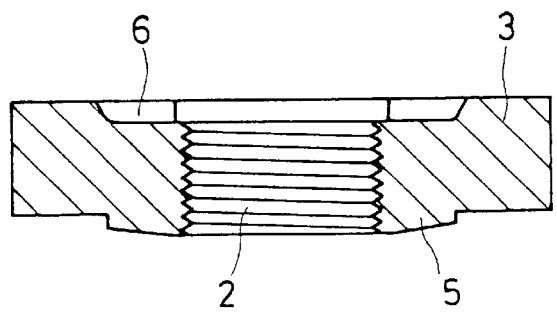
FIG. 1C is an enlarged sectional view of the nut.

As shown in FIG. 1, a plate nut assembly 1 of this invention comprises a rectangular plate-like nut 3 made of a metal, having a predetermined thickness and formed with a threaded hole 2 extending in a thickness direction in a central portion thereof, and a support tongue piece 4 having one end thereof fixed to the nut 3.

The nut 3 is formed with a protrusion 5 on one side thereof around an entrance of the threaded hole 2, and a recess 6 on another side thereof around an exit of the threaded hole 2. The recess 6 has an outer diameter substantially equal to that of the protrusion 5 formed on the one side of the nut 3.

Figure 3:
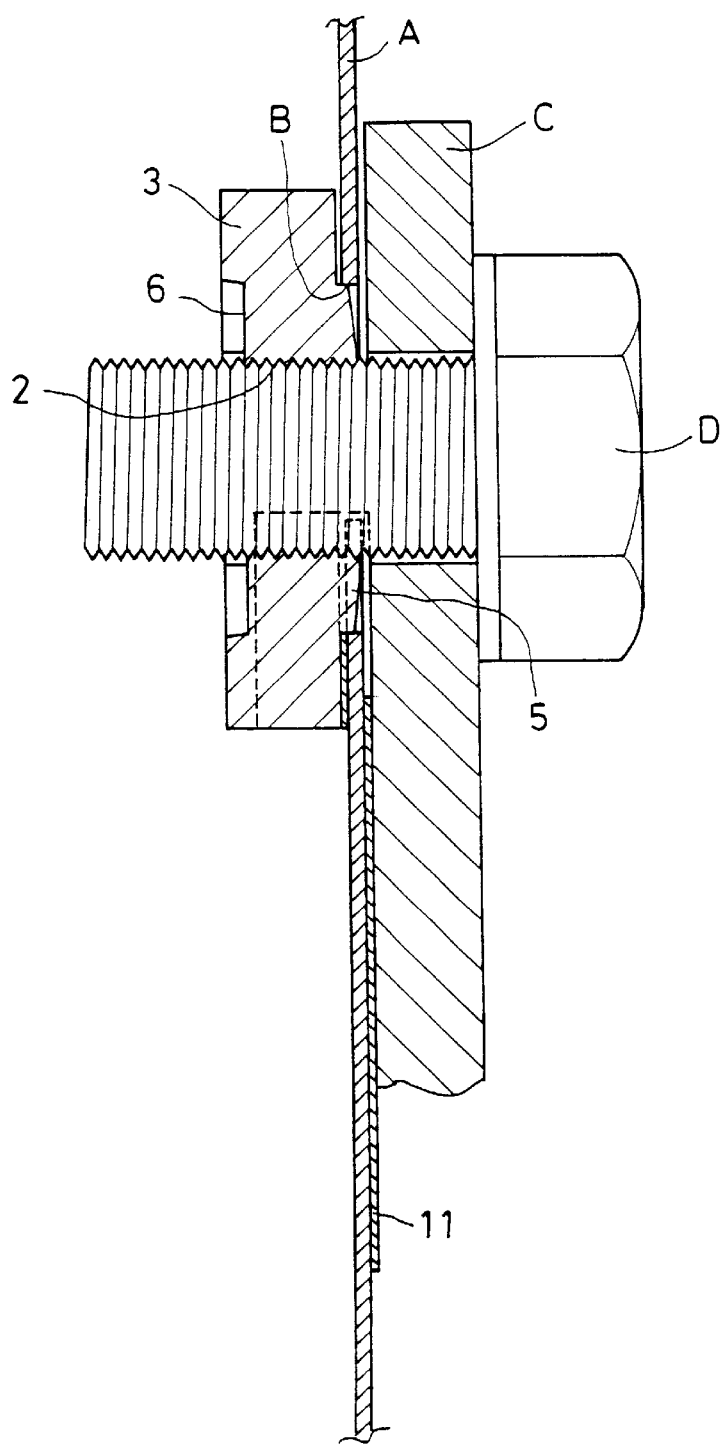
FIG. 3 is an enlarged sectional side view showing how an instrument is clamped by use of the plate nut assembly of this invention.
Figure 4:
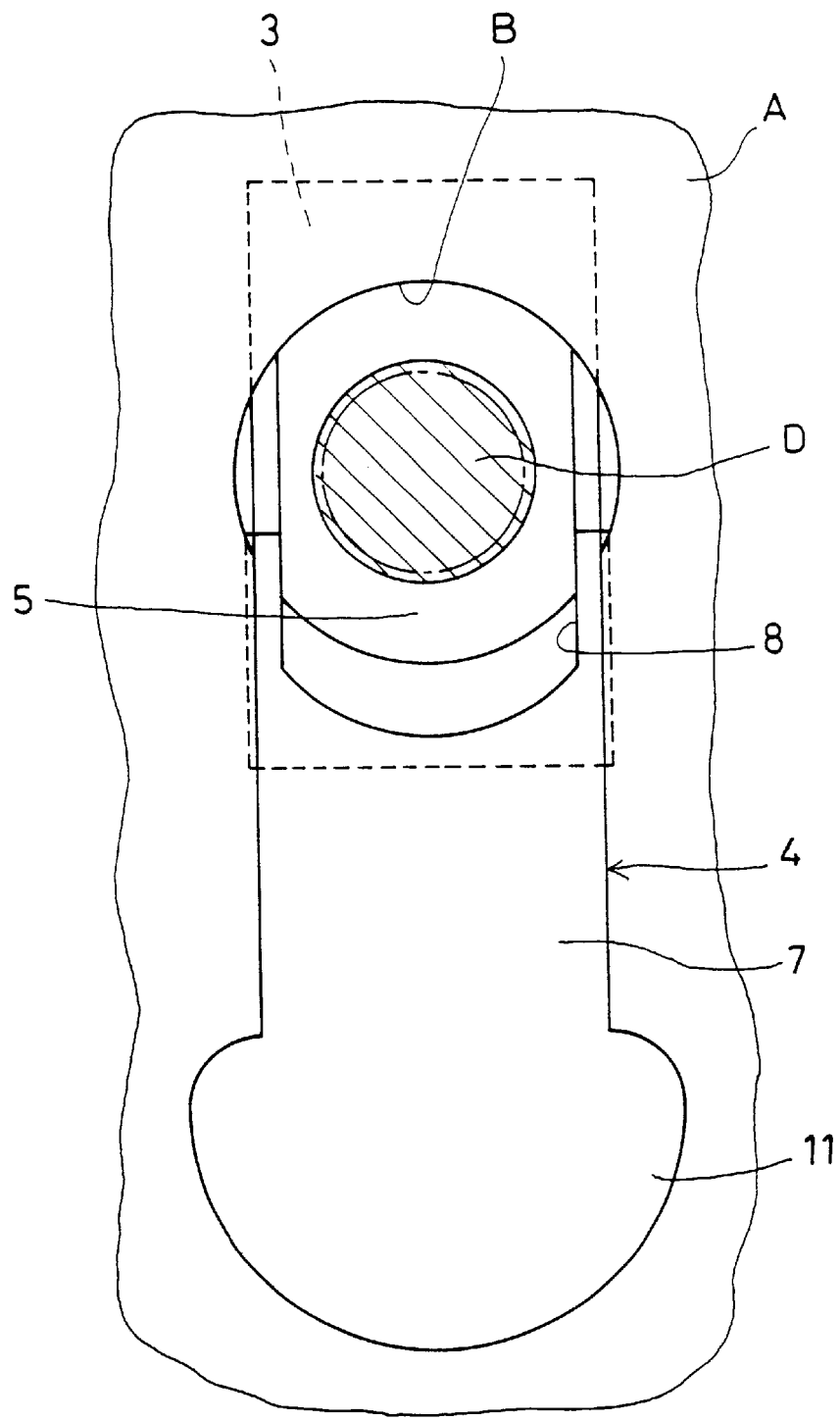
FIG. 4 is a vertical sectional enlarged front view showing a clamped state.

The protrusion 5 has a height that decreases away from an outer periphery of the threaded hole 2. The protrusion 5 is dimensioned so as to be recevied within a circular hole B formed beforehand in a wall A as shown in FIGS. 3 and 4. The protrusion 5 has a substantially elliptical shape with longitudinal ends thereof being arcuate so as to fit within the circular hole B, and with both longitudinal sides being straight. Further, the protrusion 5 has an inner edge perpendicular to a surface of the nut 3 with a protruding surface thereof inclined outwardly and downwardly from a perimeter of the threaded hole 2 either arcuately or linearly.

On the other side of the nut 3 around the exit of the threaded hole 2, the recess 6 is formed, the shape of which is substantially the same as an outer shape of the protrusion 5 formed on the one side of the nut. Opposed end walls of the recess 6 are inclined so that a distance between the opposed end walls decrease toward a bottom of the recess 6.

The protrusion 5 on the one side of the nut 3 and the recess 6 on the other side of the nut are formed simultaneously by performing a pressing operation. Specifically, by pressing a blank with a mold having a protrusion for forming the recess 6, and with the blank supported by a mold having a recess for forming the protrusion 5, material of blank swells toward one side of the blank and simultaneously the recess 6 is formed in an opposite side of the blank. By forming a swollen portion with the recess of the mold, the protrusion 5 is formed. By forming the protrusion 5 and the recess 6 simultaneously, economical production of the nut 3 becomes possible, as compared with forming the protrusion 5 by performing a machining operation such as cutting.

By inclining the opposed end walls of the recess 6 as described above, it is possible to prevent a pressing pressure, for forming the recess 6, from locally concentrating on the protrusion 5 so as to not to destroy an inner structure of the nut, and to improve releasability of the nut 3 after being shaped by the protrusion of the mold for forming the recess 6.

The support tongue piece 4 has a thin metallic plate 7 having a width that is substantially equal to that of the nut 3, and an opening 8 for receiving the protrusion 5 of the nut 3. Bent portions 9 are provided on both sides of the metallic plate 7 near one end thereof, and a fixed end 10 is fitted onto the nut 3 from the one side thereof. An enlarged portion 11 is provided at another end of the metallic plate 7. The enlarged portion 11 has a width greater than a diameter of circular hole B formed in the wall A so that the nut 3 just fits within hole B. The metallic plate 7 is bent at a position 12 nearer to fixed end 10 than it is to a center of the threaded hole 2, and the metallic plate is inclined relative to the fixed end 10 from the bent position 12.

The support tongue piece 4 has the fixed end 10 fitted onto the nut 3 with the protrusion 5 of the nut 3 partially fitting into the opening 8. The fixed end 10 substantially corresponds to a front half portion of the nut 3 relative to an inserting direction of the nut 3. The fixed end 10 and the nut 3 are fixed together by welding, bonding, pressing, threading or caulking, for example.

Figure 2A:
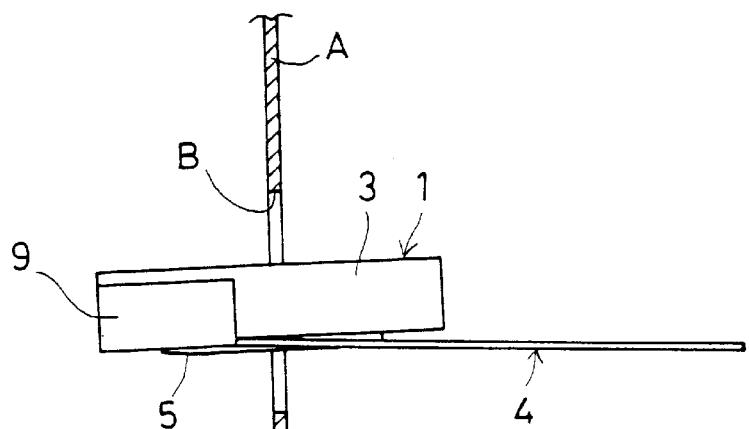
FIG. 2A is a vertical sectional view showing how the plate nut assembly is inserted into a circular hole formed in a wall.

The plate nut assembly of this invention is structured as described above. For use, a circular hole B into which the nut 3 can be inserted is formed in a wall A beforehand, and the nut 3 is inserted into the hole B in the wall A as shown in FIG. 2A while pressing a portion of the support tongue piece 4 near the enlarged portion 11 so that the tongue piece contacts the nut.

Figure 2B:
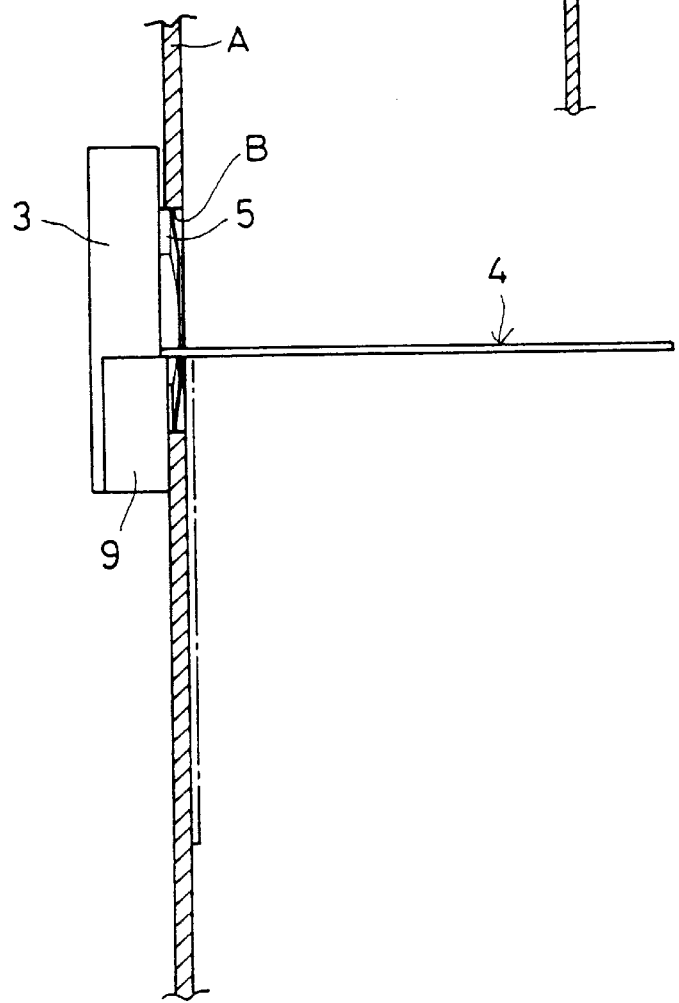
FIG. 2B is a vertical sectional view showing the nut brought into abutment with a back side of the wall.

After completely inserting the nut to a back of the wall A, as shown in FIG. 2B, the enlarged portion 11 of the support tongue piece 4 is pulled away from the wall A until the nut 3 is superposed on a back side of the wall A. At this time, since the nut 3 has its protrusion 5 opposing the back side of the wall A, and the protrusion 5 is formed with an inclined or tapered surface so that height of the protrusion decreases in a direction away from the threaded hole 2, when the nut 3 is pulled toward the back side of the wall A, the protrusion 5 abuts a peripheral edge of the circular hole B and performs a self-centering function via the inclined or tapered surface. As the nut 3 moves toward an axis of the circular hole B, the protrusion 5 completely fits into the circular hole B. Thus, the nut 3 can be positioned relative to the circular hole B such that its threaded hole 2 will be substantially coaxial with the circular hole B.

In this state, as shown in FIGS. 3 and 4, by bending a portion of the support tongue piece 4 protruding from the wall A toward the wall A, superposing a tool C on the wall A and the tongue piece 4, and threadedly tightening a bolt D passed through the tool C and into the threaded hole 2 of the nut 3, it is possible to fix the tool C to the wall A.

As described above, since the protrusion 5 provided on the nut 3 completely fits within the circular hole B in the wall A, even if an external force is applied in a direction perpendicular to an axis of the bolt D after mounting of the tool C, this external force is borne on a portion of the protrusion 5 fitted within the circular hole B, so that the tool C will not be displaced in a direction of the external force after fixing the tool to the wall.

According to this invention, because the recess 6 formed on the nut is formed so as to be inclined or tapered such that a distance between opposed end walls of the recess decreases in a direction toward a bottom of the recess, it is possible to prevent pressing pressure, for forming the recess, from locally concentrating on the protrusion 5, and thereby prevent an internal structure of the nut from being destroyed along an outer contour of the nut.

Also, releasability of the nut from the protrusion of the mold for forming the recess is improved.

What is claimed is:

1. A plate nut assembly comprising:
    a nut having
        a threaded hole extending in a thickness direction of said nut, and
        a protrusion on one side of said nut and around said threaded hole, said protrusion, continually decreasing in thickness from an inner end of said protrusion to an outer end of said protrusion; and
    a support tongue piece attached to said nut.
2. The plate nut assembly according to claim 1, wherein said nut further has a recess on an opposite side of said nut and around said threaded hole.
3. The plate nut assembly according to claim 2, wherein said recess has an outer dimension that is substantially the same as an outer dimension of said protrusion.
4. The plate nut assembly according to claim 3, wherein said recess is partially defined by opposed end walls that are inclined such that a distance between said opposed end walls decreases in a direction from a top of said recess toward a bottom of said recess.
5. The plate nut assembly according to claim 4, wherein sad nut is rectangular.
6. The plate nut assembly according to claim 5, wherein said support tongue piece is attached to said nut by having an end portion of said support tongue piece be fixed to an end portion of said nut.
7. The plate nut assembly according to claim 2, wherein said recess is partially defined by opposed end walls that are inclined such that a distance between said opposed end walls decreases in a direction from a top of said recess toward a bottom of said recess.
8. The plate nut assembly according to claim 1, wherein said nut is rectangular.
9. The plate nut assembly according to claim 1, wherein said support tongue piece is attached to said nut by having an end portion of said support tongue piece be fixed to an end portion of said nut.

* * * * *